Aug. 16, 1955    J. B. GODSHALK ET AL    2,715,710
BATTERY CHARGER
Filed Aug. 20, 1952    2 Sheets-Sheet 1

INVENTORS:
JAMES B. GODSHALK
AARON ANTON
GERARD REZEK

BY Stone, Boyden & Mack,
ATTORNEYS.

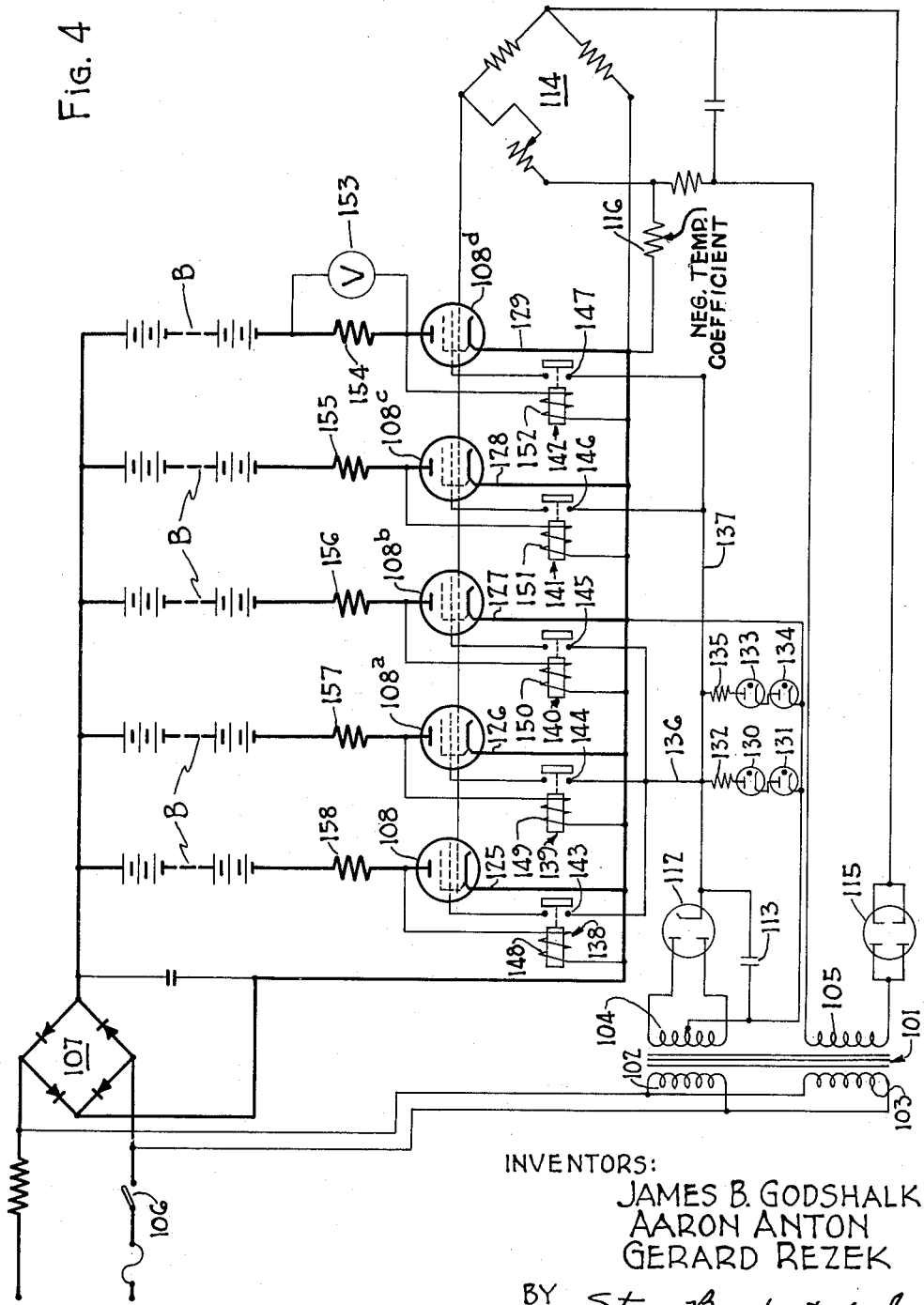

United States Patent Office 2,715,710
Patented Aug. 16, 1955

2,715,710

BATTERY CHARGER

James B. Godshalk, Philadelphia, and Aaron Anton, Glenside, Pa., and Gerard Rezek, Collingswood, N. J., assignors to Fox Products Company, Philadelphia, Pa., a corporation of Pennsylvania Application August 20, 1952, Serial No. 305,454

11 Claims. (Cl. 320—22)

This invention relates to low rate battery chargers and more particularly to devices for maintaining batteries at a substantially constant state of charge.

After manufacture and before actual use, storage batteries remain idle, first in the manufacturer's warehouse and later in distributors' plants, service stations, and the like. While idle, storage batteries gradually lose their charge as a result of the recognized phenomenon of self-discharge, and the necessity for providing dependable means for recharging idle batteries to compensate for self-discharge has been generally recognized.

In many instances, the batteries have simply been connected to a conventional trickle charger, so that charging current is supplied continuously to the batteries at a constant low rate. However, this practice has been found to be unsatisfactory for the maintenance of idle batteries because the ordinary trickle charger is capable of charging at a rate which only approximates, and does not accurately match, the self-discharge rate. This condition results because the self-discharge rate varies continuously with the battery temperature, and thus of course with ambient temperature. The relation of the self-discharge current to ambient temperature is a parobolic function, with the magnitude of discharge increasing as the ambient temperature increases. Since the conventional trickle charger provides only a constant charging current, there is a definite tendency to overcharge when the ambient temperature is relatively low. Since the charging periods involved often run to as much as one or two months, a damaging overcharge frequently results. Because of this, it has become the practice of battery manufacturers to instruct the warehousemen to avoid trickle charging, and to periodically recharge the batteries at a higher rate whenever the state of charge of the batteries drops below a predetermined level. But, such periodic recharging entails constant checking of the batteries, and an undesirable amount of manual labor and attention in the recharging operation.

Thus, there has long been a need for a device capable of supplying to idle batteries a charging current which is always just sufficient to compensate for the effect of self-discharge of the batteries, and it will be seen from the foregoing that previous devices have failed to fill this need because they were incapable of providing a charging current which varies continuously with changes in the battery self-discharge rate resulting from ambient temperature variations.

Another problem which has been encountered in this field is the difficulty in providing an apparatus which will provide charging current at a substantially constant rate independent of the number of batteries being treated. A device which will satisfy the commercial requirements for compensating for self-discharge in idle batteries must be able to handle varying numbers of batteries. Thus, in an automotive service station, the numbers of batteries connected to such an apparatus might be anywhere from one to ten or more, depending upon the stock on hand. But, if the apparatus is to function to just replace self-discharge, there can be no substantial variation of charging current with the number of batteries connected.

An object of the present invention is to provide an apparatus which will maintain one or more idle batteries at a state of full charge by continually supplying to the battery or batteries a charging current which is substantially equal to the battery self-discharge current.

Another object is to provide an apparatus capable of maintaining from one to fifty or more idle batteries at substantially full charge over long periods without manual attention and without material overcharging.

A further object is to provide a charger which will deliver a charging current substantially independent of the number of batteries connected to the charger.

Yet another object, in accordance with one embodiment of the invention, is to provide such an apparatus including means for preventing the flow of charging current while the batteries are being connected to the apparatus.

Broadly, the apparatus of the present invention comprises the combination of means for supplying charging current to the battery or batteries through an adjustable constant current device, and electrical means responsive to ambient temperature for adjusting the constant current device to vary the charging current in accordance with changes in ambient temperature. Preferably, the adjustable constant current device is an electron discharge tube having a cathode, a control grid, a screen grid and an anode, and the cathode and anode are connected in the charging circuit in series with the batteries. The output of a balanceable network including a thermally responsive impedance subjected to ambient temperature is connected across the control grid and cathode of the tube, and the screen grid is maintained at a potential sufficiently constant to assure operation of the tube as a constant current device.

In order that the invention may be understood in detail, reference is had to the accompanying drawings, which form a part of this specification, and wherein.

Figure 2:
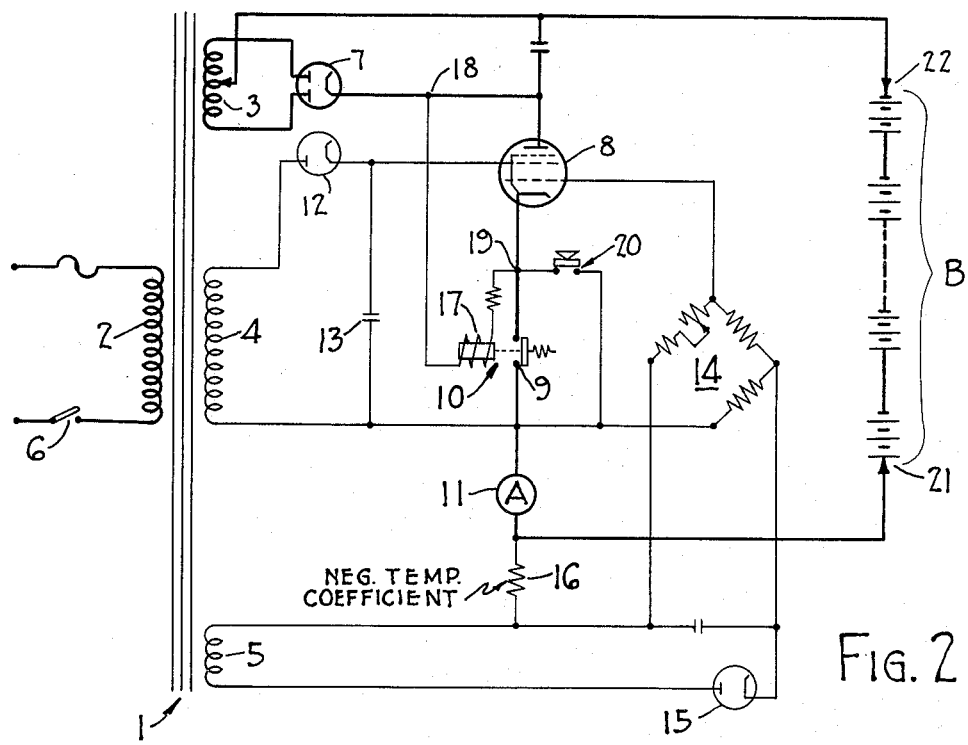
Fig. 2 is a schematic diagram of a charging apparatus constructed in accordance with one embodiment of the invention.
Figure 3:
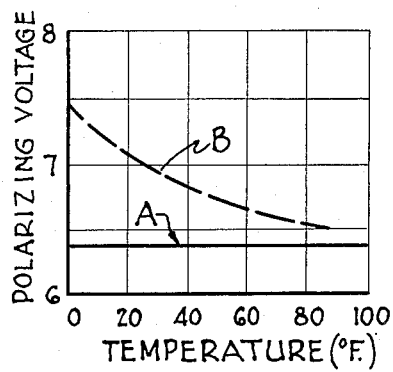

Fig. 3 is a graph showing the relation of battery polarizing voltage to ambient temperature for two cases, one where the apparatus of Fig. 2 was employed and the other where a conventional trickle charge was employed; and Fig. 4 is a schematic diagram of an apparatus constructed in accordance with another embodiment of the invention and capable of maintaining at full charge a relatively large number of batteries.

Figure 1:
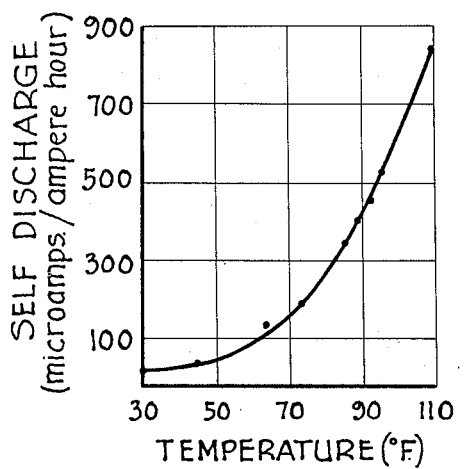
Fig. 1 is a graph depicting the relation of self-discharge of a storage battery to ambient temperature.

The effect of ambient temperature on the self-discharge of a conventional lead-acid storage battery is illustrated by the solid-line curve of Fig. 1. Here it will be noted that the variation in self-discharge current is relatively small at temperatures on the order of 30–50° F., and relatively great at higher temperatures, and that the relation is substantially parabolic. In order that the battery or batteries being treated will continually receive a charging current which is just sufficient to compensate for self-discharge, the output of the charging apparatus employed must match closely the curve shown in Fig. 1.

As seen in Fig. 2, a preferred embodiment of the invention comprises a transformer 1 having a primary winding 2 and secondary windings 3–5. The primary winding 2 is connected across a suitable source of alternating current, a manual switch 6 being provided in the primary circuit. The secondary 3 supplies a full wave rectifier 7, the output of which is supplied to a series string of batteries B through a charging circuit including the cathode and anode of an electron discharge tube 8, the contacts 9 of a normally open relay 10, and an indicator 11, which may be a conventional ammeter.

The screen grid supply for the tube 8 comprises the secondary winding 4, a half-wave rectifier 12, and filter condenser 13, as shown. The remaining secondary winding 5 is connected across the input terminals of a Wheatstone bridge 14 through a half-wave rectifier 15, and the output terminals of the bridge 14 are connected across the control grid and cathode of the tube 8. The bridge 14 includes in one arm a negative temperature coefficient thermistor 16 subjected to ambient temperature, the thermistor preferably being located adjacent the batteries B, as by being mounted on the positive terminal battery connector.

The energizing circuit for the normally open relay 10 comprises winding 17 connected in parallel with the tube 8, one of the connections being at 18 between the tube and the rectifier, and the other at 19 between the tube and the normally open contacts 9 of the relay. A normally open push button switch 20 is connected in parallel with the relay contacts 9.

Since the thermistor 16 has a marked negative temperature coefficient, the bridge 14 serves to establish a control grid potential which is a function of the ambient temperature as sensed by the thermistor. By proper choice of the bridge parameters, the shape of the overall output versus input curve for the bridge is made to match that of the self-discharge versus temperature curve shown in Fig. 1.

We have found that, if the tube 8 is such that the relation of plate current to control grid voltage is a substantially parabolic function, then it is possible to match the parabolic self-discharge rate versus temperature relation of the battery by a combination of the parabolic tube characteristics and the bridge characteristics taken in cascade, without the necessity of the bridge characteristics departing greatly from linearity. For this reason, we prefer to employ as the tube 8 a pentode, or a tetrode beam power amplifier, which tubes present the desired parabolic relation of plate current to control grid voltage.

So long as the screen grid to cathode potential is maintained substantially constant, tubes of the type mentioned operate as constant current devices, with the current adjustable by varying the control grid potential. The screen current is relatively small, and we have found that the screen supply circuit can be reduced to the simple half-wave rectifier 12 and small filter condenser 13.

In operation of the apparatus shown in Fig. 2, the batteries B to be charged are connected in the charging circuit, as by means of conventional battery clamps at 21 and 22, with the batteries arranged in opposition to the tube 8. Since relay 10 is in its normally open position, no current flows in the charging circuit, and the operator is fully protected while connecting the batteries. The main power switch 6 is now closed, the input circuit being connected to any suitable source of alternating current. Push button switch 20 is now momentarily closed, shunting the open relay contacts 9 and thus causing the relay winding 17 to be energized by current from the rectifier 7, so that contacts 9 are closed and remain closed until the charging circuit is broken or switch 6 in the primary circuit is opened.

The apparatus now supplies a charging current continuously to the batteries B in series, and in ordinary practice remains connected to the batteries so long as the batteries are stored or left idle. The value of the charging current supplied through the tube 8 depends upon the control grid to cathode potential, which is determined by the bridge 14, and which varies continuously with the ambient temperature as sensed by the thermistor 16. Since the bridge 14 has been constructed to provide an output versus input curve which substantially matches the curve obtained in Fig. 1 by plotting battery self-discharge against ambient temperature, the charging current supplied to the batteries is always substantially equal to the self-discharge current. The graph in Fig. 1 can also be read in terms of charging current versus ambient temperature, and the circular points appearing on the graph represent actual values for charging currents obtained with the apparatus of Fig. 2.

Since in most situations of commercial use it is desirable to leave the apparatus connected to a plurality of idle batteries for prolonged periods with no manual attention, it is necessary that material overcharging be prevented. This requires that the charging current supplied by the apparatus match the self-discharge of the batteries very closely, even though the ambient temperature varies widely. Fig. 3 illustrates, by curve A, the substantially constant battery polarizing voltage which is exhibited when the apparatus of Fig. 2 is connected to a series of batteries. It will be noted that batteries receive substantially no net charge from the apparatus. This is contrasted with the result obtained when a conventional trickle charger is used, supplying a constant charging current which is not matched to the battery self-discharge rate, as indicated by curve B of Fig. 3. Here, it is noted that a sizeable polarization voltage develops, particularly at the lower temperatures, so that the batteries must receive a material net charge. Since the purpose of the apparatus is normally to maintain idle batteries at a state of full charge, such a net charge will ordinarily be an overcharge, which is highly undesirable, especially when charging continues for long periods.

Since the tube 8 functions as a constant current device, the charging current is substantially independent of the number of batteries connected in the charging circuit. Thus, an apparatus as shown in Fig. 1 will operate to charge, say, from one to ten or more batteries at a charging rate always such as to just compensate for the battery self-discharge rate. This embodiment of the apparatus is particularly adapted, for example, to commercial use in garages and service stations where varying numbers of new batteries are on hand from day-to-day and must be maintained at full charge without damage from overcharging.

Fig. 4 illustrates another embodiment of the invention useful where greater numbers of idle batteries are to be treated. Here, alternating current is supplied, via a supply circuit including a master switch 106, to a rectifier 107. The direct current output of the rectifier 107 is supplied through parallel branch circuits to a plurality of series strings of batteries B. Each of the parallel branch circuits 125—129 includes the cathode and anode of an electron discharge tube 108—108$^d$, respectively, each tube being connected in series with its corresponding string of batteries, as shown. The output of a Wheatstone bridge 114, including a negative temperature coefficient thermistor 116 subjected to ambient temperature, is connected across the control grids and cathodes of the tubes 108—108$^d$ in parallel, so that the grid to cathode potential of the tubes is determined in accordance with ambient temperature, as sensed by the thermistor 116. The tubes 108—108$^d$ are pentodes, beam power amplifiers, or other grid controlled electron discharge tubes capable of operating as a constant current device.

Connected across the alternating current supply circuit between the switch 106 and rectifier 107 are the primary windings 102 and 103 of a transformer 101. Secondary winding 105 of the transformer supplies the bridge 114, via a suitable rectifier 115. Secondary winding 104 of the transformer supplies a regulated screen supply circuit for the tubes 108—108$^d$, via a rectifier 112.

Since the load requirements on the internal power supplies of the apparatus shown in Fig. 4 are quite variable, it is necessary to regulate the screen voltage. This is accomplished by including in the screen supply, in addition to the rectifier 112 and the filter condenser 113, the voltage regulator tubes 130 and 131, operating through a dropping resistor 132, and voltage regulator tubes 133 and 134, operating through a dropping resistor 135. Thus, the regulated screen supply for tubes 108—

108$^b$ is taken off at 136, and that for tubes 108$^c$ and 108$^d$ at 137.

Activation of each tube and branch circuit 125—129 is made automatic in response to connection of the batteries B in the respective branch circuit. This is accomplished by provision of relays 138—142 having normally open contacts 143—147 in the screen grid circuits of the tubes 108—108$^d$, respectively. The actuating windings 148—152 of the relays are connected in parallel with the tubes 108—108$^d$, respectively, as shown, so that connection of one or more batteries in one of the branch circuits completes that branch circuit through the relay winding, energizing the relay to close the contacts thereof, and thus establishing current flow through the corresponding tube. As an indicator, a voltmeter 153 may be connected across any of the resistors 154—158.

In other respects, the operation of the apparatus of Fig. 4 is like that of the apparatus of Fig. 2.

It will be understood that other forms of temperature responsive balanceable networks than that shown in Figs. 2 and 4 may be employed without departing from the scope of our invention.

We claim:

1. In a charging apparatus for maintaining a plurality of batteries at a given state of charge, the combination of a charging circuit for supplying direct current to the batteries, adjustable means for supplying a substantially constant current for changing number of batteries connected in said charging circuit in series with the batteries, a temperature responsive device subjected to ambient temperature, and electrical means controlled by said temperature responsive device and arranged to adjust said adjustable means to change the value of the current supplied by the adjustable means in response to changes in ambient temperature detected by said temperature responsive device.

2. In combination in a battery charger, a charging circuit, a grid-controlled electron discharge tube connected in said charging circuit in series, a balanceable network including a thermally responsive impedance subjected to ambient temperature, and means connecting the output of said network across the grid and cathode of said tube.

3. In an apparatus for maintaining a plurality of idle batteries at a given state of charge by charging the batteries at a rate substantially equal to the self-discharge rate of the batteries, the combination of a charging circuit for connecting the batteries in series across a source of direct current; an electron discharge tube having a cathode, a control grid, a screen grid and an anode, the relation of plate current to control grid voltage for said tube being a substantially parabolic function, the cathode and anode of said tube being connected in said charging current in series with the batteries to be charged; a balanceable network including a thermally responsive impedance subjected to ambient temperature; means connecting the output of said network across the cathode and control grid of said tube, and means for maintaining the screen grid of said tube at a potential sufficiently constant to assure operation of said tube as an adjustable constant current device.

4. In combination in a battery charger, a transformer having a primary winding and a secondary winding; an electron discharge tube having a cathode, a control grid, a screen grid and an anode; a rectifier connected to said secondary winding; a charging circuit connecting the output of said rectifier across the anode and cathode of said tube, said charging circuit including means for connecting a battery to be charged in series with said tube and rectifier; a balanceable network including a thermally responsive impedance subjected to ambient temperature; means for supplying said network with direct current; means connecting the output of said network across the cathode and control grid of said tube, and means for maintaining the screen grid of said tube at a potential sufficiently constant to assure operation of said tube as an adjustable constant current device.

5. In combination in a battery charger, a transformer having a primary winding and a plurality of secondary windings; a rectifier connected to one of said windings; an electron discharge tube having a cathode, a control grid, a screen grid and an anode; a charging circuit connecting the output of said rectifier across the cathode and anode of said tube and including means for connecting the battery to be charged in series with said rectifier and said tube; a balanceable network including a thermally responsive impedance subjected to ambient temperature; a second rectifier connected to a second one of said secondary windings; means connecting the output of said second rectifier to the input of said network; means connecting the output of said network across the cathode and control grid of said tube, and a regulated direct current supply circuit connecting a third one of said secondary windings across the cathode and screen grid of said tube.

6. In combination in a battery charger, a charging circuit, a grid controlled electron discharge tube connected in said charging circuit in series, a balanceable network including a thermally responsive impedance subjected to ambient temperature, means connecting the output of said network across the grid and cathode of said tube, a normally opening relay having contacts in said charging circuit in series with said tube, a relay actuating circuit including the winding of said relay connected in parallel with said tube with one connection between said contacts and said tube, a manual switch, and means connecting said switch in parallel with said contacts.

7. In combination in a battery charger, a rectifier, a plurality of grid-controlled electron discharge tubes, circuit means connecting the output of said rectifier across the anodes and cathodes of said tubes in parallel, said circuit means including means for connecting a separate group of batteries in series with each of said tubes, a balanceable network including a thermally responsive impedance subjected to ambient temperature, and means connecting the output of said network across the cathodes and control grids of said tubes in parallel.

8. In combination in a battery charger, a charging circuit including a plurality of parallel branches, a plurality of grid controlled electron discharge tubes connected one in each of said branches, a balanceable network including a thermally responsive impedance subjected to ambient temperature, and means connecting the output of said network across the cathodes and control grids of said tubes in parallel.

9. In combination in an apparatus for maintaining a plurality of idle batteries at a given state of charge by charging the batteries at a rate substantially equal to the self-discharge rate of the batteries, a charging circuit including a plurality of parallel branches; a plurality of electron discharge tubes each having a cathode, a control grid, a screen grid and an anode, each of said tubes having its cathode and anode connected in one of said branches and each of said branches including means for connecting a separate set of batteries in series with the corresponding one of said tubes; a balanceable network including a thermally responsive impedance subjected to ambient temperature; means for supplying said network with direct current; means connecting the output of said network across the cathodes and control grids of said tubes in parallel, and means for maintaining the screen grids of said tubes at a potential sufficiently constant to assure operation of said tubes as adjustable constant current devices.

10. An apparatus constructed in accordance with claim 9, including a plurality of relays each having a set of normally open contacts in the screen grid circuit of a different one of said tubes, and an energizing circuit for each of said relays, each of said energizing circuits being connected in parallel with the corresponding one of said tubes.

11. In combination in an apparatus for maintaining a plurality of idle batteries at a given state of charge by charging the batteries at a rate substantially equal to the self-discharge rate of the batteries, a charging circuit for connecting the batteries in series across a source of charging current; an electron discharge tube having a cathode, a control grid, a screen grid and an anode, the cathode and anode of said tube being connected in said charging circuit in series with the batteries to be charged; means for maintaining the screen grid of said tube at a potential sufficiently constant to assure operation of said tube as an adjustable constant current device, and electrical means responsive to ambient temperature arranged to maintain the control grid of said tube at a potential which is a function of ambient temperature.

References Cited in the file of this patent

UNITED STATES PATENTS

| | | |
|---|---|---|
| Re. 18,516 | Beetem | July 12, 1932 |
| 1,846,214 | Leingang | Feb. 23, 1932 |
| 1,919,891 | Leingang | July 25, 1933 |
| 1,919,892 | Leingang | July 25, 1933 |
| 1,976,404 | Leingang | Oct. 9, 1934 |
| 2,102,141 | Wagar | Dec. 14, 1937 |
| 2,157,139 | Mirick | May 9, 1939 |
| 2,197,423 | Agnew | Apr. 16, 1940 |
| 2,244,307 | Menzel | June 3, 1941 |
| 2,366,992 | Willing et al. | Jan. 9, 1945 |
| 2,421,523 | Rady | June 3, 1947 |
| 2,666,883 | Guelpa | Jan. 19, 1954 |

FOREIGN PATENTS

| | | |
|---|---|---|
| 474,398 | Great Britain | Nov. 1, 1937 |